United States Patent
Farrand et al.

(10) Patent No.: US 9,594,260 B2
(45) Date of Patent: Mar. 14, 2017

(54) PARTICLES FOR ELECTROPHORETIC DISPLAYS

(71) Applicant: Merck Patent GmbH, Darmstadt (DE)

(72) Inventors: Louise Diane Farrand, Dorset (GB); Emily Jane Thomas, New Milton (GB); Jonathan Henry Wilson, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 18 days.

(21) Appl. No.: 14/400,679

(22) PCT Filed: May 7, 2013

(86) PCT No.: PCT/EP2013/001336
§ 371 (c)(1),
(2) Date: Nov. 12, 2014

(87) PCT Pub. No.: WO2013/170933
PCT Pub. Date: Nov. 21, 2013

(65) Prior Publication Data
US 2015/0129819 A1    May 14, 2015

(30) Foreign Application Priority Data

May 14, 2012    (EP) .................................... 12003787

(51) Int. Cl.
| | | |
|---|---|---|
| G02F 1/00 | (2006.01) |
| B05D 3/00 | (2006.01) |
| B05D 3/12 | (2006.01) |
| G02F 1/167 | (2006.01) |
| B05D 1/18 | (2006.01) |
| C08F 2/44 | (2006.01) |
| C08F 292/00 | (2006.01) |

(52) U.S. Cl.
CPC ............. *G02F 1/0018* (2013.01); *B05D 1/18* (2013.01); *B05D 3/007* (2013.01); *B05D 3/12* (2013.01); *C08F 2/44* (2013.01); *C08F 292/00* (2013.01); *G02F 1/167* (2013.01); *G02F 2001/1678* (2013.01)

(58) Field of Classification Search
CPC .. B05D 1/18; B05D 3/007; B05D 3/12; C08F 2/44; C08F 292/00; G02F 1/0018; G02F 1/167; G02F 2001/1678
USPC .......................... 252/583; 424/401; 427/487
See application file for complete search history.

(56) References Cited

U.S. PATENT DOCUMENTS

| | | |
|---|---|---|
| 5,380,362 A | 1/1995 | Schubert |
| 5,403,518 A | 4/1995 | Schubert |
| 5,599,889 A | 2/1997 | Stover et al. |
| 5,783,614 A | 7/1998 | Chen et al. |
| 5,932,633 A | 8/1999 | Chen et al. |
| 5,964,935 A | 10/1999 | Chen et al. |
| 6,117,368 A | 9/2000 | Hou |
| 6,194,488 B1 | 2/2001 | Chen et al. |
| 6,842,275 B2 | 1/2005 | Kawai |
| 6,956,690 B2 | 10/2005 | Yu et al. |
| 7,038,655 B2 | 5/2006 | Herb et al. |
| 7,052,766 B2 | 5/2006 | Zang et al. |
| 7,110,162 B2 | 9/2006 | Wu et al. |
| 7,170,670 B2 | 1/2007 | Webber |
| 7,226,550 B2 | 6/2007 | Hou et al. |
| 7,236,290 B1 | 6/2007 | Zhang et al. |
| 7,247,379 B2 | 7/2007 | Pullen et al. |
| 7,277,218 B2 | 10/2007 | Hwang et al. |
| 7,304,634 B2 | 12/2007 | Albert et al. |
| 7,880,955 B2 | 2/2011 | Naijo et al. |
| 2004/0165455 A1 | 8/2004 | Kumacheva et al. |
| 2006/0245037 A1 | 11/2006 | Yamamoto et al. |
| 2007/0128352 A1 | 6/2007 | Honeyman et al. |
| 2007/0268244 A1 | 11/2007 | Chopra et al. |
| 2008/0291526 A1 | 11/2008 | Lin et al. |
| 2009/0025601 A1 | 1/2009 | Vasudevan et al. |
| 2009/0201569 A1 | 8/2009 | Akashi et al. |
| 2009/0207476 A1* | 8/2009 | Yanagisawa ........ C08F 290/068 359/296 |
| 2010/0020385 A1 | 1/2010 | Yamamoto et al. |
| 2011/0079756 A1 | 4/2011 | Chun et al. |
| 2011/0175939 A1 | 7/2011 | Moriyama et al. |
| 2012/0112131 A1 | 5/2012 | Li et al. |

FOREIGN PATENT DOCUMENTS

| | | |
|---|---|---|
| GB | 2438436 A | 11/2007 |
| JP | 2008122468 A | 5/2008 |
| JP | 2008274248 A | 11/2008 |
| JP | 2008274249 A | 11/2008 |
| JP | 2009031329 A | 2/2009 |
| JP | 2009256635 A | 11/2009 |
| WO | WO-99/10767 A1 | 3/1999 |
| WO | WO-02093246 A1 | 11/2002 |
| WO | WO-2004067593 A2 | 8/2004 |
| WO | WO-2005017046 A2 | 2/2005 |
| WO | WO-2005036129 A2 | 4/2005 |
| WO | WO-2009/086079 A2 | 7/2009 |
| WO | WO-2010/089059 A1 | 8/2010 |
| WO | WO-2010089057 A2 | 8/2010 |
| WO | WO-2010104606 A1 | 9/2010 |
| WO | WO-2010148061 A2 | 12/2010 |
| WO | WO-2011017446 A1 | 2/2011 |
| WO | WO-2011075720 A1 | 6/2011 |
| WO | WO-2012019704 A1 | 2/2012 |
| WO | WO-2012/152392 A1 | 11/2012 |

OTHER PUBLICATIONS

International Search Report for PCT/EP2013/001336 mailed Oct. 2, 2013.
Kim, M., et al., "Synthesis of mondisperse PS-co-PDMS microspheres by dispersion polymerization", Materials Science and Engineering: C, vol. 27, (2007), pp. 1247-1251.

(Continued)

*Primary Examiner* — Ling Choi
*Assistant Examiner* — Chun-Cheng Wang

(57) ABSTRACT

This invention relates to colored particles comprising core particles and a polymeric shell, a process for their preparation, electrophoretic fluids comprising such particles, and electrophoretic display devices comprising such fluids.

16 Claims, No Drawings

(56) References Cited

OTHER PUBLICATIONS

Klein, S., et al., "Preparation of monodisperse PMMA microspheres in nonpolar solvents by dispersion polymerization with a macromonomeric stabilizer", Colloid Polymer Science, vol. 202, (2003), pp. 7-13.
International Search Report for PCT/EP2013/001337 mailed Sep. 26, 2013.
International Search Report for PCT/EP2013/001338 mailed Oct. 4, 2013.
International Search Report for PCT/EP2013/001335 mailed Sep. 25, 2013.
International Search Report for PCT/EP2013/001339 mailed Sep. 25, 2013.
International Search Report for PCT/EP2013/001341 mailed Sep. 26, 2013.
International Search Report for PCT/EP2013/001340 mailed Oct. 2, 2013.
Smulders et al., "Seeded Emulsion Polymerization of Block Copolymer Core-Shell Nanoparticles with Controlled Particle Size and Molecular Weight Distribution Using Xanthate-Based RAFT Polymerization", Macromolecules, vol. 37, pp. 4474-4483 (2004).
Shaffer et al., "Dispersion Polymerizations in Carbon Dioxide Using Siloxane-Based Stabilizers", Macromolecules, vol. 29, pp. 2704-2706 (1996).
O'Neill et al., "Dispersion Polymerization in Supercritical $CO_2$ with Siloxane-Based Macromononer. 2. The Particles Formation Regime", Macromolecules, vol. 31, pp. 2848-2856 (1998).

\* cited by examiner

PARTICLES FOR ELECTROPHORETIC DISPLAYS

CROSS-REFERENCE TO RELATED APPLICATIONS

This application is a national stage application (under 35 U.S.C. §371) of PCT/EP2013/001336, filed May 7, 2013, which claims benefit of European Application No. 12003787.4, filed May 14, 2012, both of which are incorporated herein by reference in their entirety.

This invention relates to coloured particles comprising core particles and a polymeric shell, a process for their preparation, electrophoretic fluids comprising such particles, electrophoretic display devices comprising such fluids, and the use of the particles in optical, electrooptical, electronic, electrochemical, electrophotographic, electrowetting and electrophoretic displays and/or devices, in security, cosmetic, decorative or diagnostic applications.

EPDs (Electrophoretic Displays) and their use for electronic paper have been known for a number of years. An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Mainly black and white particles are used.

Particles suitable for use in electrophoretic displays (EPD), e.g. coloured electronic paper have been exemplified in recent patent literature; e.g. (U.S. Pat. No. 7,304,634, GB 2 438 436, US 2007/0268244, WO 2010/089057, WO 2012/019704). Particles coated with a surface layer to promote good dispersibility in dielectric media are disclosed in WO 2004/067593, US 2011/0079756, U.S. Pat. No. 5,964,935, U.S. Pat. No. 5,932,633, U.S. Pat. No. 6,117,368, WO 2010/148061, WO 2002/093246, WO 2005/036129, US 2009/0201569, U.S. Pat. No. 7,236,290, JP 2009031329, U.S. Pat. No. 7,880,955, and JP 2008122468. The use of polydimethylsiloxane stabilisers in the specific synthesis of polymer particles is described in the state of the art (Kim et al, Materials Science and Engineering, C 27 (2007), 1247-1251; Klein et al, Colloid Polym Sci (2003) 282: 7-13; JP 2009256635, JP 2008274248, JP 2008274249).

However, there continues to be a need for improved electrophoretic fluids and coloured polymer particles which can be easily prepared and dispersed in non-polar media.

The present invention relates to particles comprising at least two pigment core particles of different optical properties encapsulated by a polymeric shell comprising monomer units of at least one polymerisable steric stabiliser, at least one co-monomer, optionally at least one charged co-monomer, and optionally at least one crosslinking co-monomer, a process for their preparation, the use of the particles in electrophoretic fluids, and electrophoretic display devices comprising these fluids. The subject matter of this invention specifically relates to reflective coloured particles, and to electrophoretic fluids and displays comprising such reflective coloured particles.

The particles according to the invention preferably comprise at least one inorganic pigment core particle of high refractive index and white reflectivity in combination with at least one inorganic or organic coloured pigment particle.

The present coloured particles are hybrid polymer/pigment particles. These particles can comprise a highly reflective pigment core particle, especially a titania core particle, combined with coloured organic or inorganic pigment core particles. This has the effect of increasing the reflectivity or 'Y' value of the formed coloured particle compared to a similar particle without titania in the core. The Y value is derived from the CIE colour space system, where Y is defined to be the brightness or luminance. Particles having both titania and a coloured pigment inside them do not show a detrimental effect or change in hue, i.e. if a particle is prepared by combining $TiO_2$ with a coloured pigment to form a particle, the colour simply appears a brighter. The highly reflective pigment core particle can also be a coloured reflective inorganic or organic pigment, preferably in combination with a highly reflective white pigment core particle.

Furthermore, if reduction of settling is a more important factor, the particles may comprise white $SiO_2$ particles which have a low density.

The invention provides a method to produce particles suitable for use in EPD which have controllable size, reflectivity, density, monodispersity, and steric stability and require no drying process to disperse in a solvent suitable for EPD. Advantageously, the invention provides coloured particles with increased reflectivity. So, EPD displays comprising reflective coloured particles of the invention appear bright and appealing to a viewer.

The present invention provides particles, especially reflective coloured particles which can be easily dispersed in non-polar media and show electrophoretic mobility. Particle size, polydispersity, and density can be controlled and the present incorporation of pigment into polymeric particles does neither require multiple process steps nor expensive drying steps, i.e. freeze drying. The present process involves one simple polymerisation step. The present process facilitates the formulation of electrophoretic fluids since it is done in a non-polar organic solvent instead of aqueous media. The particles can be prepared in the solvent of choice for EPD formulations, therefore no unwanted solvent contamination occurs and no disposal or recycling of solvent is necessary. Particles of the invention are easily dispersed in dielectric, organic media, which enables switching of the particles in an applied electric field, preferably as the electrically switchable component of a full colour e-paper or electrophoretic display.

The present coloured polymer particles can be produced by encapsulating at least two, preferably highly reflective, inorganic particles or organic pigment particles in an organic polymer by a dispersion polymerisation. This yields a coloured hybrid particle which exhibits excellent reflectivity where the inorganic material is encapsulated by a tough polymer shell. This tough shell prevents particle agglomeration.

Particles of the invention additionally comprise sterical stabilisers covalently bonded into the pigment core particles. Advantageously, the present invention does not require custom synthesised stabilisers with difficult to control steric lengths and multistep complex syntheses with expensive or difficult to synthesise components.

The invention enables the synthesis of new coloured, preferably cross-linked polymer particles for EPD and allows formation of monodisperse polymer particles in a non-polar solvent suitable for use in an EPD. No solvent transfer or drying is required. A steric stabiliser is readily incorporated into the coloured polymer particles which do not need specific chemical groups and/or reactions. The stabiliser solely needs the presence of another monomer and is polymerised into the particle and cannot be removed by solvent washing or over time. The particles may comprise at least 5% by weight of a steric stabiliser, preferably at least 20% by weight, based on the weight of the polymer particles. Advantageously, the coloured polymeric particles of the invention have a much lower density than inorganic pigment particles whose use has been reported in EPD. In an EPD, these particles should settle much more slowly than inorganic pigment particles, allowing for better bistability. Additionally, the particles do not swell in non-polar EPD solvents especially when cross-linked through additional cross-linking co-monomers. Furthermore, the coloured polymer particles of the invention have good mobility when switched in an electrophoretic cell.

An essential component of the present invention is a coloured or black inorganic pigment, preferably a coloured reflective or black pigment. According to general knowledge, the optical effect of coloured inorganic pigments is caused by selective light absorption and also to a large extent by selective light scattering, and the optical effect of black inorganic pigments is caused by non-selective light absorption. Preferably, the inorganic pigments may be dispersible in the hydrocarbon solvent. The function of the pigment is to colour the particle. Preferably the following pigments are used: metal compounds, e.g. oxides, mixed oxides, oxide hydroxides, sulfides, sulfoselenides, silicates, sulfates, chromites, molybdates, and/or carbonates, and/or carbon blacks. Preferred metal compounds comprise the following metals: iron, chromium, cadmium, nickel, zinc, cobalt, and/or manganese. Preferred pigments are: Red Iron Oxide, Green Chromium Oxide, Azuri Blue 34L2000 pigment, Yellow Iron Oxide pigment, Manganese Ferrite pigment, black copper chromite pigment, black iron (III) oxide pigment, and carbon black pigments. Examples of suitable commercially available pigments are given below (C.I. Numbers are in brackets):

Iron Oxide Red (Pigment Red 101), Molybdate Red (Pigment Red 104), Lead Oxide red (Pigment Red 105), Cadmium Red (Pigment Red 108), Oxide Red (PR102), Chromium Oxide Green (Pigment Green 17), Cadmium Green (PG14), Paris Green (PG21), Scheele's Green (PG22)

Milori Blue (Pigment Blue 27), Ultramarine Blue (Pigment Blue 29), Cobalt Blue (PB28) and Cerulean Blue (PB35), Han Blue $BaCuSi_4O_{10}$, Egyptian Blue (PB31), Prussian Blue (PB27)

Iron Oxide Black (Pigment Black 11) $Fe_3O_4$, Titanium Black, Carbon Black (Pigment Black 7)

Chrome Yellow (Pigment Yellow 34), Zinc Yellow (Pigment Yellow 36), Cadmium Yellow (PY34), Iron Oxide (Pigment Yellow 34), Aureolin (PY40), Yellow Ochre (PY43), Naples Yellow (PY41), Titanium Yellow (PY53), Mosaic Gold ($SnS2$)

Orange Chrome Yellow (Pigment Orange 21), Cadmium Orange (PO20)

Iron Oxide Brown (Pigment Brown 6), Raw Umber (PBr7), Raw Sienna (PBr7), Han Purple ($BaCuSi_2O_6$).

Coloured or black inorganic pigments with a spherical particle shape are preferred. Especially, inorganic pigments with a primary particles size in the range of 10-1800 nm, preferably in the range of 100-1600 nm.

The inorganic pigments used often contain agglomerates of the primary particles. Such agglomerates may show a secondary particle size in the range of 100 nm-3000 nm, preferably in the range of 100-2000 nm. Preferably, the primary particle size is regained as far as possible before further physical processes. Methods can include milling (sand mill, pearl mill and ball mill), use of a rotor-stator (e.g. an Ika Ultra-Turrax), and application of ultrasound to achieve a dispersion.

Alternatively to the above described inorganic pigments, organic pigments can also be used. It is essential that the pigment is dispersible and not soluble in the hydrocarbon solvent.

BASF Heliogen pigment range. These are easily dispersible phthalocyanine blue and green pigments.

Other possible ranges of pigments commercially available from BASF include Cinqusai, Irgazin, Chromophtal, Irgalite, Lithol, Paliogen and Pailiotol.

Clariant pigment ranges include Hostaperm, Novoperm, PV Fast, Graphtol, Hansa, Permanent and Novotex.

Yellow organic pigments are typically based on Arylide structures, preferably Pigment Yellow 13. Blue and green pigments are typically based on phthalocyanine structures, preferably Pigment Blue 15 and Pigment Green 7. Violet pigments used might typically be based on dioxazine structures, preferably Pigment Violet 23. Red pigments used are preferably Pigment Red 57:1.

Primarily, the invention provides reflective coloured particles by incorporating inorganic pigments of sufficiently high refractive index and white reflectivity into an organic polymer in combination with an inorganic or organic coloured pigment particle described above, to yield a hybrid polymeric particle which exhibits good reflective properties. Preferably, white reflective particles are used having a refractive index of 1.8, especially ≥2.0, are used. Especially titanium dioxide, zinc oxide, silicon dioxide, alumina, barium sulphate, zirconium dioxide, calcium carbonate, kaolinite, diantimony trioxide and/or tin dioxide, especially titanium dioxide, can be used.

Preferably, titanium dioxide based pigments are used which could have the rutile, anatase, or amorphous modification, preferably rutile or anatase. Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont R103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765. Preferably, Du Pont R960, and Sachtleben Hombitan Anatase are used.

The invention allows density control by tunability of the shell around the inorganic core pigments. The amount of the organic polymeric material in the reaction can be increased relative to the inorganic pigment which results in a lower density particle, or if higher density is desired, the pigment ratio can be increased.

Pigments encapsulated within the particles are preferably well dispersed in a non-aggregated state in order to achieve the optimum optical properties. If the pigment is high density, the optimum loading of the pigment within polymer may not only be affected by the optical properties but also the density of the resulting particle in order to achieve improved bistability. Pigments are present in the particle (on weight of total particle) from 5-95%, preferably 20-80% and even more preferably 30-60%.

A further essential component of the present invention is a polymerisable steric stabiliser. The polymerisable steric stabilisers need to be soluble in non-polar solvents, particularly dodecane, and have some reactive functionality such that they take part in the polymerisation. This creates a particle with a covalently bound surface of sterically stabilising compounds providing stability during and after polymerisation. The polymerisable steric stabiliser can be used in a range of molecular weights which allows strict control over the steric barrier surrounding the particles to prevent aggregation. The polymerisable group incorporates irreversibly into the particles and is therefore anchored to the surface.

A typical polymerisable steric stabiliser of the invention is a poly(dimethylsiloxane) macro-monomer (PDMS). The poly(dimethylsiloxane) may comprise one or two polymerisable groups, preferably one polymerisable group.

The following stabiliser types could be used and are commercially available from Gelest Inc.:

Methacryloyloxypropyl terminated polydimethylsiloxanes (mws 380, 900, 4500, 10000, 25000) Methacryloyloxypropyl terminated polydimethylsiloxanes (mw 600), Methacryloyloxypropyl terminated polydimethylsiloxanes (1500, 1700), (3-acryloxy-2-hydroxypropoxypropyl) terminated PDMS (mw 600), Acryloxy terminated ethyleneoxide-dimethylsiloxane-ethyleneoxide ABA block copolymers (mw 1500, 1700), methacyloyloxpropyl terminated branched polydimethylsiloxanes (683), (methacryloxypropyl)methylsiloxanes—Dimethylsiloxane copolymers (viscosity 8000, 1000, 2000), (acryloxypropyl)methylsiloxane—dimethylsiloxanes copolymers (viscosity 80, 50), (3-acryloxy-2-hydroxypropoxypropyl)methylsiloxane-dimethylsiloxane copolymers (mw 7500), mono(2,3-epoxy)propyl ether terminated polydimethylsilxoanes (mw 1000, 5000), monomethacryloxypropyl terminated polydimethylsiloxanes asymmetric (mw 600, 800, 5000, 10000), monomethacryloxypropyl functional polydimethylsiloxanes—symmetric (mw 800), monomethacryloxypropyl terminated polytrifluoropropylmethylsiloxanes—symmetric (mw 800) monovinyl terminated polydimethylsiloxanes (mw 5500, 55000, monovinyl functional polydimethylsilxanes—symmetric (mw 1200).

Preferred polymerisable groups are methacrylate, acrylate, and vinyl groups, preferably methacrylate and acrylate groups. Most preferred are poly(dimethylsiloxane) methacrylates (PDMS-MA), especially methacryloyloxypropyl terminated PDMS-MAs as shown in Formulas 1 and 2, wherein n=5-10000. Most preferred are poly(dimethylsiloxanes) with one methacrylate group.

Formula 1

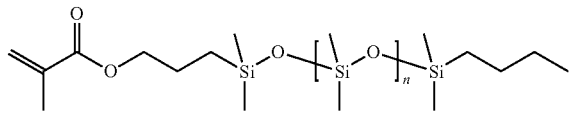

Formula 2

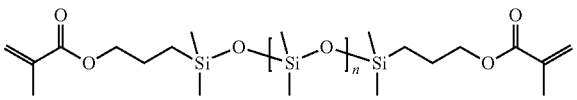

The polymerisable steric stabiliser of the invention preferably has a molecular weight in the range of 1000-50000, preferably 3500-35000, most preferably 5000-25000. Most preferred are methacrylate terminated polydimethylsiloxanes with a molecular weight of 10,000 or more.

The particles of the invention can be prepared from many polymer types. Preferably, monomers are used where the monomer is soluble in the reactive mixture and the polymer is insoluble in the reactive mixture with relatively high Tg.

This allows hard composite particles to be formed which tend to be spherical in shape and have easily tunable size.

The main requirement for the polymer composition is that it needs to be produced from a monomer that is soluble but polymer insoluble in the EPD fluid, i.e. dodecane and can also provide some linkage to the surface of the titania during polymerisation. Low solubility of the polymer material in the EPD dispersion media reduces the tendency for ripening processes to take place and helps define the particle size and size dispersity.

The particles can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer). Especially preferred is methyl methacrylate but many others could be used, the following are all examples of which could be used which are commercially available from the Sigma-Aldrich chemical company.

The following are all examples which could be used and which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy) ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate.

Preferably Methyl methacrylate (MMA), Methacrylic acid, Ethyl methacrylate (EMA), and/or n-Butyl methacrylate (BMA) are used.

Acrylates:

Acrylic acid, 4-Acryloylmorpholine, [2-(Acryloyloxy) ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethyihexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidised acrylate, 3-Sulfopropyl acrylate potassium salt, Tetrahydrofurfuryl acrylate, 3-(Trimethoxysilyl)propyl acrylate, 3,5,5-Trimethylhexyl acrylate.

Preferably Methyl acrylate, acrylic acid, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl) trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl) methyl]acrylamide.

Styrenes

Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene,N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl) trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate.

Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene) biscarbamate, Bis[4-(vinyloxy)butyl]succinate, Bis[4-(vinyloxy)butyl]terephthalate, Bis[4-(vinyloxymethyl) cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, Hexanediol dimethacrylate, 1,6-Hexanediylbis[oxy (2-hydroxy-3,1-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0] decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl]isocyanurate, Tri(propylene glycol) diacrylate.

Optionally, the monomer composition comprises at least one charged co-monomer,

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino) propyl]trimethylammonium chloride, [2-(Methacryloyloxy) ethyl]trimethylammonium methyl sulfate solution, tetraallyl ammonium chloride, diallyl dimethyl ammonium chloride, (Vinylbenzyl)trimethylammonium chloride.

Preferably 2-methacryloxy ethyl trimethyl ammonium chloride (MOTAC) and acryloxy ethyl trimethyl ammonium chloride (AOTAC) are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly (acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl) Acrylic Acid, 3-(4-Methoxyphenyl)Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-Yl)-2-Oxoethyl] Acrylic Acid, 2-(2-(2-Chloroanilino)-2-Oxoethyl)-3-(4-Methoxyphenyl)Acrylic Acid, 2-(2-((2-Hydroxyethyl) Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid.

Especially preferred co-monomers are methyl methacrylate, methyl acrylate, and methacrylic acid, acrylic acid, ethane-1,2 diacrylate, butane-1,4 diacrylate, hexane-1,6-diacrylate. Furthermore, mixtures of co-monomers described in the foregoing may be used. Preferred co-monomers mixtures comprise methyl methacrylate, methyl acrylate, methacrylic acid, acrylic acid, ethane-1,2 diacrylate, butane-1,4 diacrylate, hexane-1,6-diacrylate, trimethylolpropane triacrylate, 2-methacryloxy ethyl trimethyl ammonium chloride (MOTAC) and/or acryloxy ethyl trimethyl ammonium chloride (AOTAC).

Advantageously, the polymerisable compositions of the invention comprise a combination of the above-mentioned preferred compounds of polymerisable steric stabiliser, co-monomer, and optionally cross-linking co-monomer. Most preferred are combinations of methacrylate terminated polydimethylsiloxanes with a molecular weight of 10,000 or more, 1, and methyl methacrylate in combination with at least two different organic or inorganic pigments selected from the above described preferred pigments.

Charging the polymer can also be facilitated by using an initiator which is charged leaving that charge residing as an end-group on the polymer. Such examples are 2,2'-azobis (2-methylpropionamidine)dihydrochloride (V-50) (Wako Chemicals), potassium peroxodisulfate (KPS), ammonium peroxodisulfate (APS), sodium peroxodisulfate (SPS), 2,2'-azobiscyanovaleric acid (ACVA) (Wako Chemicals), 2,2'-azobis[2-(2-imidazolin-2-yl)propane]dihydrochloride (VA044) (Wako Chemicals).

Charging does not have to come from the initiator fragment so initiators which can also be used are those such as 2,2'-azobis(isobutyronitrile) (AIBN) (Wako Chemicals), 2,2'-azobis(2-methylbutyronitrile) (Vazo 67) (Wako Chemicals) and benzoyl peroxide.

Optionally, the polymerisable compositions of the invention comprise a chain transfer agent, e.g. catalytic chain transfer reagents, alkyl and aryl thiols, alcohols and carboxylic acids, halogenated organics and selected inorganic salts. Examples of suitable chain transfer agents are 2-propanol, adipic acid, thioglycolic acid, 2-mercaptoethanol, sodium hypochlorite, carbon tetrachloride and heavy metal poryphyrins, particularly cobalt porphyrins preferably octane thiol.

The polymerisable composition of the invention usually comprises, 0.1-80%, preferably 10-60% by weight of at least one coloured inorganic pigment, or 0.01-20%, preferably 1-15% by weight of at least one coloured organic pigment, 0.1-80%, preferably 10-60% by weight of at least one white reflective inorganic pigment 0.1-50%, preferably 5-40%, by weight of at least one polymerisable steric stabiliser, 30-95%, preferably 40-90%, by weight of co-monomer, optionally 0.001-20%, preferably 1-10%, by weight of at least one surfactant, optionally 1-40%, preferably 1-10%, by weight of cross-linking co-monomer, optionally 1-30%, preferably 1-10%, by weight of charged co-monomer, optionally 0-3%, by weight of chain transfer agent, and 0.1-10%, preferably 0.1-7.5%, by weight of initiator, all percentages are based on the total weight of the polymerisable composition (except solvent).

The coloured polymer particles of the invention are preferably prepared using a dispersion polymerisation. This is a convenient single step method of preparing monodisperse coloured particles. It is performed in a fluid which is a good solvent for the monomer and a non-solvent for the synthesised polymer particles. This solvent can also be used as the same solvent for EPD, e.g. dodecane. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane. Especially preferred is dodecane. The concentration of the particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the coloured polymer particles are simply separated from the reaction suspension by filtration, preferably by pouring the suspension through a pore size filter, i.e. a 0.1 µm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation.

Preferred changes which can be made in such cases are to the reaction temperature, reactor design and the type and speed of stirring.

Thus, a batch polymerisation process is used for manufacture versus a semi-continuous batch process because of limited versatility and simple evaluations of reaction formulation.

Polymerisable compositions of the invention may preferably comprise a surfactant. Typical surfactants are soluble in aliphatic solvents used for polymerisation and have an oil soluble tail to provide stability with a hydrophilic head to provide adsorption to the pigment particle surface. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Examples are the Span, Brij and Tween range (Sigma-Aldrich), the Solsperse, Ircosperse and Colorburst range (Lubrizol), the OLOA range (Chevron Chemicals) and Aerosol-OT (A-OT) (Aldrich). A-OT (dioctyl sulfosuccinate sodium salt), Span 80 and Span 85 (partially unsaturated sorbitan trioleate) are particularly useful to disperse and coat titania in this reaction. Single surfactants as well as blends of surfactants may be used.

Preferably the polymerisation according to the invention is a free radical polymerisation.

Typical process conditions are described for a mixture of titanium dioxide and green chrome oxide pigment coated according to the invention. Titanium dioxide and green chrome oxide pigment are added to a non-polar hydrocarbon solvents, preferably dodecane and a PDMS-methacrylate, and a surfactant, preferably a sorbitan mono-, di- or tri-oleate such as Span 85. The solution is lightly sonicated to disperse the pigments. A comonomer, preferably MMA, and optionally a chain transfer agent, preferably octanethiol are then added to the solution which is stirred under nitrogen, then heated to 60-90° C., preferably 85° C. in a sonic bath. Sonication is applied to the reaction and an initiator, preferably azobisisobutyronitrile is added to initiate polymerisation. The reaction is allowed to proceed for 2-6, preferably 4 hours after which time the reaction is cooled and the particles are cleaned by centrifugation and redispersion in dodecane if required.

Polymer particles prepared according to the invention are preferably spherical particles with a size (diameter) in the range of 50-1200 nm, preferably 400-1000 nm, especially 400-700 nm, and preferably with a monodisperse size distribution. Smaller or larger particles can be further separated if required by centrifugation. Particle sizes are determined by photon correlation spectroscopy of hydrocarbon particle dispersions by a common apparatus such as a Malvern NanoZS particle analyser or preferably by SEM (Scanning Electron Microscopy) and image analysis.

Particles of the invention are primarily designed for use in electrophoretic displays, especially for use in mono, bi or polychromal electrophoretic devices. A typical electrophoretic display preferably consists of the particles dispersed in a low polar or non-polar solvent along with additives to improve electrophoretic properties, such as stability and charge. Examples of such dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).). Preferable surfactant additives in this work are Solsperse range and A-OT, and even more preferably Solsperse 17,000, 13650, 11000 and Solplus K500, A-OT and Span 85. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachloroethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic nanoparticle such as titania, alumina or barium sulphate, coated with a surface layer to promote good dispersibility in dielectric media and a dielectric fluid media. The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767) and WO 2005/017046) The Electrophoretic fluid is then incorporated into an Electrophoretic display element by a variety of pixel architectures, such as can be found in C. M. Lampert, Displays; 2004, 25(5) published by Elsevier B.V., Amsterdam.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Particles of the invention may also be used in optical, electrooptical, electronic, electrochemical, electrophotographic, electrowetting displays and/or devices, e.g. TIR (total internal reflection electronic devices), and in security, cosmetic, decorative, and diagnostic applications. The use in electrowetting displays is preferred. Electrowetting (ew) is a physical process where the wetting properties of a liquid droplet are modified by the presence of an electric field. This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO2011/017446, WO 2010/104606, and WO2011075720.

The disclosures in the cited references are thus expressly also part of the disclosure content of the present application. In the claims and the description, the words "comprise/comprises/comprising" and "contain/contains/containing" mean that the listed components are included but that other components are not excluded. The following examples explain the present invention in greater detail without restricting the scope of protection.

EXAMPLES

Reagents are purchased from Sigma-Aldrich unless otherwise stated. PDMS monomer is purchased from Gelest Inc. Titanium Dioxide used is R960, obtained from DuPont. Inorganic pigments are sourced from Rockwood and used without further purification and Heliogen and Irgalite organic pigments are sourced from BASF and used without further purification.

Particle size is measured by SEM.

The characterisation of the formulations is performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Electrophoretic mobility measurements are made on a Malvern Zetasizer Nano ZS. The measurement is made using a combination of Laser Doppler velocimetry and phase analysis light scattering. The formulations are first diluted (1 drop of dispersion into approximately 2 ml dodecane). The measurement is made using the Universal Dip cell (suitable for non-aqueous systems) and a glass cuvette. Mobility unit of measure is µmcm/Vs.

Example 1

Preparation of a Dispersion of Green Reflective Particles

Polydimethylsiloxane monomethacrylate terminated, mw. 10,000 (2.08 g), dodecane (100 ml), titanium dioxide (2.06 g), Rockwood green chrome oxide pigment (2.06 g) and Span 85 (0.206 g) are charged to a 250 ml 3-neck round bottom flask. The flask is fitted with an overhead stirrer, condenser and nitrogen bubbler. The flask is placed in an ultrasonic bath and is subjected to low power ultrasound for 30 minutes, followed by degassing for 30 minutes, by bubbling nitrogen through the dispersion with a needle. In a separate flask, methyl methacrylate (11.0 ml), AIBN (107 mg) and octane thiol (126 µl) are combined and nitrogen is bubbled through to degas. The dispersion flask is placed in the sonic bath at 80° C., and the contents are stirred with an overhead stirrer at 300 rpm, under a flow of nitrogen. The monomer solution is then added to this pigment dispersion at a rate of 3.8 ml per hour using a syringe pump. Addition is complete after 3 hours. After a further 1 hour, the flask is allowed to cool to room temperature and the contents are filtered though a 50 micron cloth. The green dispersion is cleaned by centrifugation and replacing the supernatant with clean dodecane, this is repeated three times.

Example 2

Preparation of a Dispersion of Red Reflective Particles

Polydimethylsiloxane monomethacrylate terminated, mw. 10,000 (2.08 g), dodecane (100 ml), titanium dioxide (2.06 g), Rockwood red ferroxide 216M (2.06 g) and Span 85 (0.206 g) are charged to a 250 ml 3-neck round bottom flask. The flask is fitted with an overhead stirrer, condenser and nitrogen bubbler. The flask is placed in an ultrasonic bath and is subjected to low power ultrasound for 30 minutes, followed by degassing for 30 minutes, by bubbling nitrogen through the dispersion with a needle. In a separate flask, methyl methacrylate (11.0 ml), AIBN (107 mg) and octane thiol (126 µl) are combined and nitrogen is bubbled through to degas. The dispersion flask is placed in the sonic bath at 80° C., and the contents are stirred with an overhead stirrer at 300 rpm, under a flow of nitrogen. The monomer solution is then added to this pigment dispersion at a rate of 3.8 ml per hour using a syringe pump. Addition is complete after 3 hours. After a further 1 hour, the flask is allowed to cool to room temperature and the contents are filtered though a 50 micron cloth. The red dispersion is cleaned by centrifugation and replacing the supernatant with clean dodecane, this is repeated three times.

Example 3

Preparation of a Dispersion of Blue Reflective Particles

Polydimethylsiloxane monomethacrylate terminated, mw. 10,000 (2.08 g), dodecane (100 ml), titanium dioxide (2.06 g), Rockwood Royal Blue pigment (2.06 g) and Span 85 (0.206 g) are charged to a 250 ml 3-neck round bottom flask. The flask is fitted with an overhead stirrer, condenser and nitrogen bubbler. The flask is placed in an ultrasonic bath and is subjected to low power ultrasound for 30 minutes, followed by degassing for 30 minutes, by bubbling nitrogen through the dispersion with a needle. In a separate flask, methyl methacrylate (11.0 ml), AIBN (107 mg) and octane thiol (126 µl) are combined and nitrogen is bubbled through to degas. The dispersion flask is placed in the sonic bath at 80° C., and the contents are stirred with an overhead stirrer at 300 rpm, under a flow of nitrogen. The monomer solution is then added to this pigment dispersion at a rate of 3.8 ml per hour using a syringe pump. Addition is complete after 3 hours. After a further 1 hour, the flask is allowed to cool to room temperature and the contents are filtered though a 50 micron cloth. The blue dispersion is cleaned by centrifugation and replacing the supernatant with clean dodecane, this is repeated three times.

Example 4

Preparation of a Dispersion of Blue Reflective Particles

Polydimethylsiloxane monomethacrylate terminated, mw. 10,000 (2.08 g), dodecane (100 ml), titanium dioxide (8.24 g), Heliogen Blue D7086 pigment (0.52 g) and Span 85 (0.412 g) are charged to a 250 ml 3-neck round bottom flask. The flask is fitted with an overhead stirrer, condenser and nitrogen bubbler. The flask is placed in an ultrasonic bath and is subjected to low power ultrasound for 30 minutes, followed by degassing for 30 minutes, by bubbling nitrogen through the dispersion with a needle. In a separate flask, methyl methacrylate (11.0 ml), AIBN (214 mg) and octane thiol (126 µl) are combined and nitrogen is bubbled through to degas. The dispersion flask is placed in the sonic bath at 80° C., and the contents are stirred with an overhead stirrer at 300 rpm, under a flow of nitrogen. The monomer solution is then added to this pigment dispersion at a rate of 3.8 ml per hour using a syringe pump. Addition is complete after 3 hours. After a further 1 hour, the flask is allowed to cool to room temperature and the contents are filtered though a 50 micron cloth. The blue dispersion is cleaned by centrifugation and replacing the supernatant with clean dodecane, this is repeated three times.

Example 5

Preparation of a Dispersion of Green Reflective Particles

Polydimethylsiloxane monomethacrylate terminated, mw. 10,000 (2.08 g), dodecane (100 ml), titanium dioxide (8.24 g), Heliogen Green 8725 pigment (0.52 g) and Span 85 (0.412 g) are charged to a 250 ml 3-neck round bottom flask. The flask is fitted with an overhead stirrer, condenser and nitrogen bubbler. The flask is placed in an ultrasonic bath and is subjected to low power ultrasound for 30 minutes, followed by degassing for 30 minutes, by bubbling nitrogen through the dispersion with a needle. In a separate flask, methyl methacrylate (11.0 ml), AIBN (214 mg) and octane thiol (126 µl) are combined and nitrogen is bubbled through to degas. The dispersion flask is placed in the sonic bath at 80° C., and the contents are stirred with an overhead stirrer at 300 rpm, under a flow of nitrogen. The monomer solution is then added to this pigment dispersion at a rate of 3.8 ml per hour using a syringe pump. Addition is complete after 3 hours. After a further 1 hour, the flask is allowed to cool to room temperature and the contents are filtered though a 50 micron cloth. The green dispersion is cleaned by centrifugation and replacing the supernatant with clean dodecane, this is repeated three times.

Example 6

Preparation of a Dispersion of Magenta Reflective Particles

Polydimethylsiloxane monomethacrylate terminated, mw. 10,000 (2.08 g), dodecane (100 ml), titanium dioxide (8.24 g), Irgalite Rubine 4BV (0.52 g) and Span 85 (0.412 g) are charged to a 250 ml 3-neck round bottom flask. The flask is fitted with an overhead stirrer, condenser and nitrogen bubbler. The flask is placed in an ultrasonic bath and is subjected to low power ultrasound for 30 minutes, followed by degassing for 30 minutes, by bubbling nitrogen through the dispersion with a needle. In a separate flask, methyl methacrylate (11.0 ml), AIBN (214 mg) and octane thiol (126 µl) are combined and nitrogen is bubbled through to degas. The dispersion flask is placed in the sonic bath at 80° C., and the contents are stirred with an overhead stirrer at 300 rpm, under a flow of nitrogen. The monomer solution is then added to this pigment dispersion at a rate of 3.8 ml per hour using a syringe pump. Addition is complete after 3 hours. After a further 1 hour, the flask is allowed to cool to room temperature and the contents are filtered though a 50 micron cloth. The magenta dispersion is cleaned by centrifugation and replacing the supernatant with clean dodecane, this is repeated three times.

Example 7

Preparation of a Dispersion of Yellow Reflective Particles

Polydimethylsiloxane monomethacrylate terminated, mw. 10,000 (2.08 g), dodecane (100 ml), titanium dioxide (8.24 g), Irgalite Yellow BAW pigment (0.52 g) and Span 85 (0.412 g) are charged to a 250 ml 3-neck round bottom flask. The flask is fitted with an overhead stirrer, condenser and nitrogen bubbler. The flask is placed in an ultrasonic bath and is subjected to low power ultrasound for 30 minutes, followed by degassing for 30 minutes, by bubbling nitrogen through the dispersion with a needle. In a separate flask, methyl methacrylate (11.0 ml), AIBN (214 mg) and octane thiol (126 µl) are combined and nitrogen is bubbled through to degas. The dispersion flask is placed in the sonic bath at 80° C., and the contents are stirred with an overhead stirrer at 300 rpm, under a flow of nitrogen. The monomer solution is then added to this pigment dispersion at a rate of 3.8 ml per hour using a syringe pump. Addition is complete after 3 hours. After a further 1 hour, the flask is allowed to cool to room temperature and the contents are filtered though a 50 micron cloth. The yellow dispersion is cleaned by centrifugation and replacing the supernatant with clean dodecane, this is repeated three times.

Example 8

Electrophoretic Formulation Containing a Dispersion of Example 1 Reflective Green Particles A 2.00 g sample of electrophoretic ink is prepared by vortex mixing green polymer/pigment hybrid particles (Example 1) (0.0605 g), AOT (0.0606 g) and dodecane (1.8950 g). The dispersion is then roller mixed for 30 minutes. The zetapotential is then measured (−31.8 mV)

Example 9

Electrophoretic Formulation Containing a Dispersion of Example 2 Reflective Red Particles A 2.00 g sample of electrophoretic ink is prepared by vortex mixing red polymer/pigment hybrid particles (Example 2) (0.0602 g), AOT (0.0605 g) and dodecane (1.8939 g). The dispersion is then roller mixed for 30 minutes. The zetapotential is then measured (−14.9 mV)

Example 10

Electrophoretic Formulation Containing a Dispersion of Example 3 Reflective Blue Particles A 2.00 g sample of electrophoretic ink is prepared by vortex mixing blue polymer/pigment hybrid particles (Example 3) (0.0622 g), AOT (0.0622 g) and dodecane (1.9513 g). The dispersion is then roller mixed for 30 minutes. The zetapotential is then measured (−24.5 mV)

Example 11

Electrophoretic Formulation Containing a Dispersion of Example 4 Reflective Blue Particles A 2.00 g sample of electrophoretic ink is prepared by vortex mixing blue polymer/pigment hybrid particles (Example 4) (0.0596 g), AOT (0.0601 g) and dodecane (1.8781 g). The dispersion is then roller mixed for 30 minutes. The zetapotential is then measured (−40.8 mV)

Example 12

Electrophoretic Formulation Containing a Dispersion of Example 5 Reflective Green Particles A 2.00 g sample of electrophoretic ink is prepared by vortex mixing green polymer/pigment hybrid particles (Example 5) (0.0598 g), AOT (0.0601 g) and dodecane (1.8826 g). The dispersion is then roller mixed for 30 minutes. The zetapotential is then measured (−62.1 mV)

Example 13

Electrophoretic Formulation Containing a Dispersion of Example 6 Reflective Magenta Particles A 2.00 g sample of electrophoretic ink is prepared by vortex mixing magenta polymer/pigment hybrid particles (Example 6) (0.0604 g), AOT (0.0601 g) and dodecane (1.8827 g). The dispersion is then roller mixed for 30 minutes. The zetapotential is then measured (−131.0 mV)

Example 14

Electrophoretic Formulation Containing a Dispersion of Example 7 Reflective Yellow Particles A 2.00 g sample of electrophoretic ink is prepared by vortex mixing yellow polymer/pigment hybrid particles (Example 7) (0.0600 g), AOT (0.0603 g) and dodecane (1.8903 g). The dispersion is then roller mixed for 30 minutes. The zetapotential is then measured (−16.9 mV).

The invention claimed is:

1. Particles consisting of at least two pigment core particles of different optical properties encapsulated by a polymeric shell consisting of monomer units of at least one polymerisable steric stabiliser, at least one co-monomer, optionally at least one charged co-monomer, and optionally at least one crosslinking co-monomer, wherein the particles are electrophoretic particles.

2. The particles according to claim 1, wherein the particles comprise at least one inorganic pigment core particle of high refractive index and white reflectivity in combination with at least one inorganic or organic coloured pigment particle.

3. The particles according to claim 1, wherein the pigment core particles comprise titanium dioxide in the rutile, anatase, or amorphous modification.

4. The particles according to claim 1, wherein the pigment core particles comprise at least one coloured reflective or black pigment.

5. The particles according to claim 1, wherein the pigment core particles comprise at least one coloured reflective or black pigment and titanium dioxide in the rutile, anatase, or amorphous modification.

6. The particles according to claim 1, wherein the polymerisable steric stabiliser is a poly(dimethylsiloxane) macromonomer with at least one polymerisable group and a molecular weight in the range of 1000-50000.

7. The particles according to claim 1, wherein the polymerisable steric stabiliser is a methacryloyloxypropyl terminated polydimethylsiloxane.

8. The particles according to claim 1, wherein the percentage of polymerisable steric stabiliser is at least 5% by weight based on the weight of the polymer particle.

9. The particles polymer particles according to claim 4, wherein the coloured polymer particles have a diameter of 400-1000 nm.

10. A process for the preparation of particles according to claim 1 comprising
   a) dispersing at least two pigment particle of different optical properties in a solution of at least one polymerisable steric stabiliser in a non-polar organic solvent;
   b) adding, at least one co-monomer, at least one initiator, and optionally at least one chain transfer agent;
   c) subjecting the dispersion of step b) to heating and sonication for polymerisation,
   d) optionally washing by repeated centrifugation and redispersion in fresh solvent, and
   e) optionally isolating the resulting coated particles.

11. A method comprising utilizing the particles according to claim 1 in optical, electrooptical, electronic, electrochemical, electrophotographic, electrowetting and electrophoretic displays and/or devices, and in security, cosmetic, decorative, and diagnostic applications.

12. A method comprising utilizing the particles prepared by a process according to claim 9 in optical, electrooptical, electronic, electrochemical, electrophotographic, electrowetting and electrophoretic displays and/or devices, and in security, cosmetic, decorative, and diagnostic applications.

13. An electrophoretic fluid comprising particles according to claim 1.

14. An electrophoretic fluid comprising particles prepared by the process according to claim 9.

15. An electrophoretic display device comprising an electrophoretic fluid according to claim 12.

16. The electrophoretic display device according to claim 14, wherein the electrophoretic fluid is applied by a technique selected from inkjet printing, slot die spraying, nozzle spraying, and flexographic printing, or any other contact or contactless printing or deposition technique.

* * * * *